May 17, 1966 S. J. M. DENISON ETAL 3,252,145

ELECTRIC DATA STORAGE APPARATUS

Filed June 29, 1961 2 Sheets-Sheet 1

INVENTORS:
SAMUEL JOHN MARSHALL DENISON
REGINALD HUGH ALLMARK
WILFRED JAMES JONES

By: Stevens, Davis, Miller & Mosher
Attorneys

ELECTRIC DATA STORAGE APPARATUS

INVENTORS:
SAMUEL JOHN MARSHALL DENISON
REGINALD HUGH ALLMARK
WILFRED JAMES JONES

By: Stevens, Davis, Miller & Mosher
Attorneys

United States Patent Office 3,252,145

Patented May 17, 1966

3,252,145
ELECTRIC DATA STORAGE APPARATUS

Samuel John Marshall Denison, Stafford, and Reginald Hugh Allmark and Wilfred James Jones, both of Kidsgrove, Stoke-on-Trent, England, assignors to The English Electric Company Limited, Strand, London, England, a British company Filed June 29, 1961, Ser. No. 120,636
Claims priority, application Great Britain, July 7, 1960, 23,853/60
4 Claims. (Cl. 340—172.5)

This invention relates to electric storage apparatus for storing temporarily data, that is words of information. Such words of information normally comprises a plurality of digits each of which may be represented by two or more separately distinguishable electric signals or states. For example, where a word has binary digits as in a number expressed in binary or binary-coded decimal form each digit may be represented by the presence or absence of an electric signal. Other words of information may have digits in the respective digit positions which have different numbers of separately distinguishable values, and any apparatus for storing such words must have storage units capable of responding to the various separately-distinguishable signals which represent the possible values of the digits in the various digit positions.

According to the present invention an electric storage apparatus for storing temporarily words of information includes, in combination, an input-output register for accepting words supplied to it and comprising a plurality of multi-stable-state devices, one for each digit position in such words, a plurality of storage units each capable of storing one such word, write-in means for causing a word for the time being present in the register to be transferred into one of the storage units on receipt of a write-in signal, the write-in means being operative in response to successive write-in signals to transfer words present successively in the register to successive storage units, and read-out means for causing a word stored in a storage unit to be transferred back to the register on receipt of a read-out signal, the read-out means being operative in response to successive read-out signals to transfer words stored in successive storage units in succession to the register in an order which is the reverse of that in which they were stored in the respective storage units.

Figure 1:
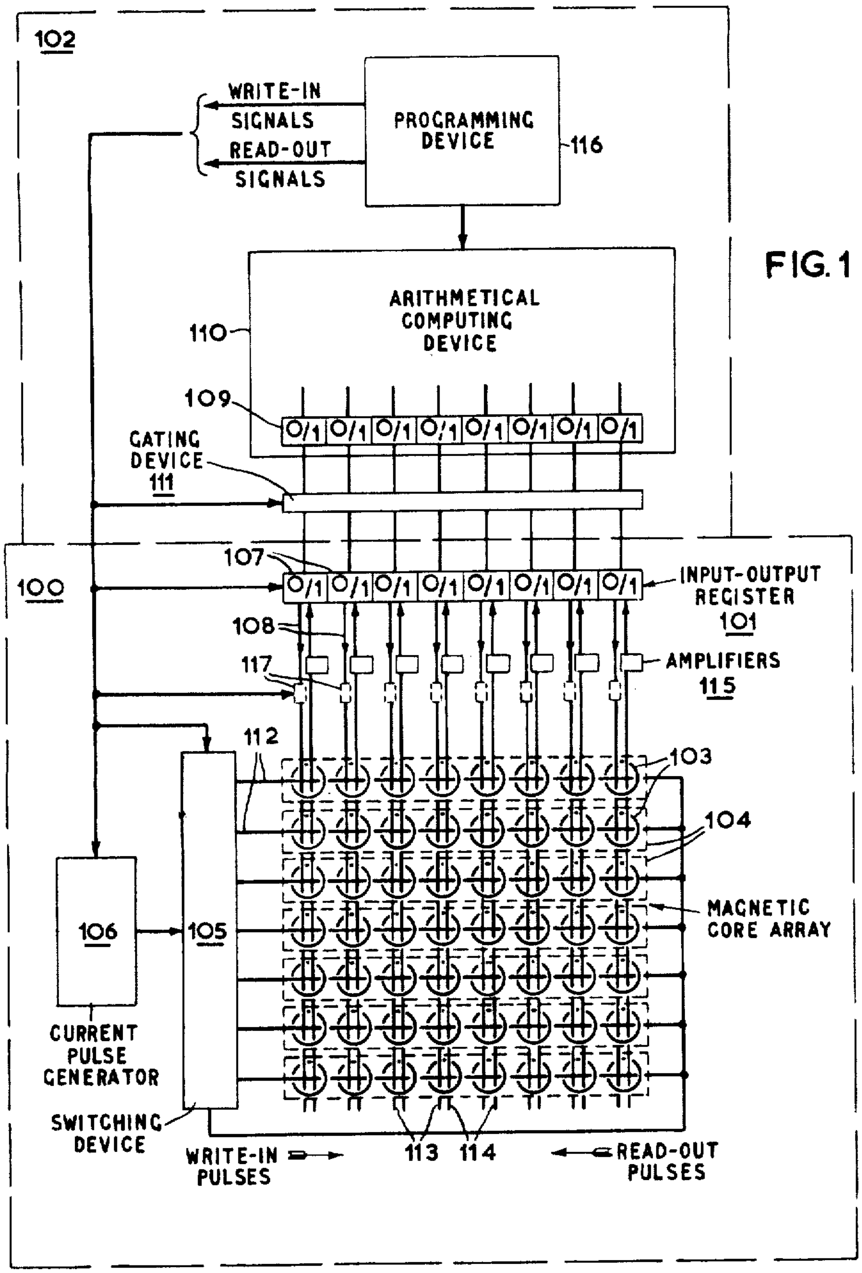
Figure 2:
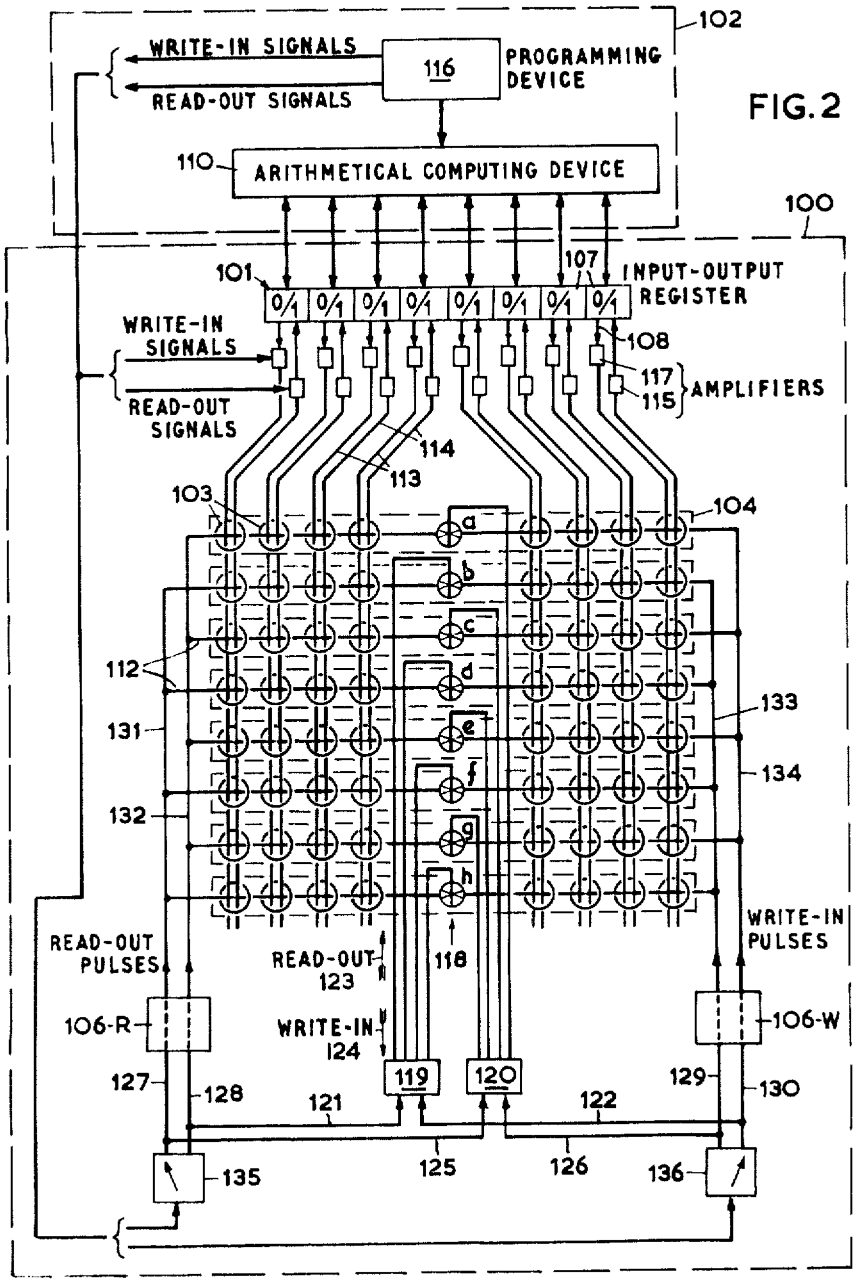

Other features of the present invention, as set out in the appended claims, will appear from the following description of two electric data storage apparatuses arranged according to the present invention. In the accompanying drawings FIGURE 1 shows diagrammatically one of the storage apparatuses, whilst FIGURE 2 shows diagrammatically the second and preferred storage apparatus. Each apparatus is shown in the drawings in conjunction with a digital computer.

Referring now to FIGURE 1 the first storage apparatus is shown enclosed within a dotted rectangle 100, and includes an input-output register 101 for receiving words of information, the digits of which are represented by either of two separately-distinguishable values, from a digital computer 102 for temporary storage in the storage apparatus, and for receiving from means forming part of the storage apparatus words previously stored in the apparatus; an array of bistable storage devices 103 arranged in row and column formation and constituting a number of storage units 104 for storing temporarily words presented to the input-output register by the computer; a switching device 105 for selecting a storage unit into which to transfer a word presented to the register by the computer or from which to transfer a word into the register for subsequent use by the computer; and a current pulse generator 106 for providing in response to "write-in" and "read-out" signals or instructions supplied by the computer 102 corresponding electric current pulses for influencing the states of the storage devices in accordance with the signals or instructions.

The input-output register 101 comprises a number of similar bistable electronic devices 107, there being one for each digit position of the words to be accommodated in the register. Each of these devices is arranged to produce an output voltage signal, of a substantially constant predetermined value, at an output circuit 108 only when the device is in the "unit" state, and these devices are connected with corresponding bistable devices in an output register 109 of an arithmetical computing device 110, incorporated in the computer 102, through a gating device 111.

The bistable storage devices 103 of the storage units 104 are of the ferro-magnetic kind, each comprising an annular core member made from a ferro-magnetic material having a substantially rectangular hysteresis loop. Thus the magnetic state of each core member can be changed only by the application of a predetermined relatively high reversing excitation.

The number of storage units 104 is determined by the maximum number of words that it is desired to be able to store at any one time, but in the drawing only a few are shown for the sake of convenience.

Associated with the storage units 104 are a number of electric control circuits 112 each of which is arranged to electro-magnetically link with all of the storage devices in one storage unit. The various control circuits 112 are connected with the switching device 105 for connection in a particular sequential manner to the current pulse generator 106.

The storage devices 103 which occupy corresponding digit positions in the respective storage units 104, that is those disposed in a vertical column in the drawing, are electromagnetically linked by electric write-in or biasing circuits 113 and by read out or detecting circuits 114, the biasing circuits 113 being connected with the output circuits 108 of the bistable devices 107 of the input register 101 for energisation in dependence upon the states of the bistable devices, and the detecting circuits 114 being connected with the input circuits of the bistable devices 107 through amplifiers 115 whereby to influence the bistable devices in accordance with the signals carried by the detecting circuits when reading out. The switching device 105 comprises an electric gating circuit arrangement for connecting the output circuit of the current pulse generator 106 with one control circuit 112 at a time, the particular control circuit to be selected for connection with the pulse generator being dependent on the control circuit which is connected at the time of receiving a write-in or read-out instruction and the type of instruction, i.e. whether a write-in or a read-out instruction.

In response to a write-in signal from a programming device 116 incorporated in the computer 102 the switching device steps to the next lower control circuit 112 before passing the write-in pulse from the generator 106, whereas on receipt of a read-out signal from the programming device the read-out pulse from the generator is passed to the particular control circuit 112 then connected with the generator before the switching device steps to the next higher control circuit in readiness for the next instruction from the computer.

The current pulse generator 106 is arranged to produce on receipt of a write-in signal from the programming device a write-in current pulse of magnitude equal to one half of that required to reverse the remanent flux of the magnetic core storage devices 103, whilst on receipt of a read out signal from the programming device the generator 106 produces a current pulse of the opposite sense and of magnitude sufficient to reverse the remanent flux in the magnetic core storage devices 103.

The output voltage of each bistable device 107 when in the unit state only is such as to cause a constant current to flow in the associated write-in circuit 113, this current being of magnitude equal to one half of the value required to reverse the remanent flux in the magnetic core storage devices 103 and of a sense such as to assist the write-in pulses applied to the control circuits 112.

In operation the programming device 116 amongst other things instructs, by means of write-in and read-out signals, the current pulse generator 106, the switching device 105, the gating device 111, and the input-output register 101 when to pass a word present in the output register 109 of the computer for storage in one of the storage units 104 and when to pass back to the output register 109 of the computer for use therein the word last stored in the storage apparatus.

Before putting the storage apparatus into use the storage units 104 are all reset to a zero state in readiness for the writing in of words produced by the computer, by causing the programming device 116 to produce a resetting succession of read-out signals whereby to read out from each storage unit in turn.

If it is desired to write-in a word appearing in the output register 109 of the computing device the input circuits of the input-output register 101 are rendered temporarily responsive, by the operation of the gating device 111 in response to a write-in signal from the programming device 116, to the output signals provided by the output register of the computing device, so that the bi-stable devices 107 of the register 101 are set to represent the line of digits appearing in the output register of the computing device. The bi-stable devices 107 then in the unit state circulate bias currents through the associated write-in or biasing circuits 113.

In response to the write-in signal the switching device 105 operates immediately to connect the current pulse generator 106 with the control circuit 112 of the next lower storage unit 104, and after operation of the switching device the current pulse generator transmits a write-in pulse through the selected control circuit 112 so that the storage devices of that unit which are also linked with vertical biasing circuits 113 carrying bias currents are switched automatically from the "zero" state to the "unit" state, the other storage devices of the unit remaining unaltered in the zero state.

If after further operations of the computing device it is again desired to store temporarily the result appearing in the output register 109 of the computing device for use later, the input register 101 which is reset immediately on receipt of a write-in signal is again rendered temporarily responsive to the output of the computing device by a write-in signal from the programming device, the output line of digits from the computer then being stored temporarily in the input register and bias currents being circulated in appropriate vertical biasing circuits 113 to indicate the presence of "units" in the line of digits to be stored.

The switching device 105 is then responsive to the write-in signal to connect the current pulse generator with the control circuit 112 of the next lower storage unit, and the current pulse generator then transmits a write-in pulse through this circuit so as to switch to the unit state those storage devices which are already linked by the vertical biasing circuits 113 which carry biasing currents.

Further lines of digits appearing in the output register of the computing device are passed to the input register 101 for temporary storage in the storage units 104 only on the production of write-in signals by the programming device, successive lines of digits being stored in succession in the various storage units 104 as a result of the progressive transference of the current pulse generator from one control circuit 112 to the next lower control circuit.

If, however, during a computing sequence it is desired to read-out and use in the computing device some of the lines of digits stored in the successive storage units, the programming device provides a read-out signal as and when required. The bistable devices 107 of the input register 101 are automatically reset by these read-out signals so as to clear the input register in readiness for a line of digits to be read out of the last-filled storage unit 104.

On receipt of a read-out signal the switching device 105 leaves the current pulse generator temporarily connected with the control circuit 112 with which it was previously connected after storing the last line of digits transferred from the computing device, and the current pulse generator transmits a read-out current pulse through that control circuit 112 so as to reverse in sense the remanent flux in any associated storage device 103 whose magnetic state is representative of the unit state. Such storage devices are thereby returned to the zero state. The switching device 105 then operates to connect the next higher control circuit 112 with the pulse generator in readiness for carrying out the next instruction.

The consequent reversal of flux in such a storage device induces a voltage in the associated vertical sensing circuit 114 thus providing a signal for setting the associated bistable device 107 of the input register 101 to the unit state. When the input register carries the required line of digits the gating device 111 operates to connect the input register 101 temporarily with the output register 109 of the computing device so as to transfer the line of digits to the computing device for use therein.

On the production of a subsequent read-out signal by the programming device, the above sequence of events is repeated so as to transfer the then last-stored word from its storage unit 104 into the input register 101 from whence it is passed to the output register 109 of the computing device 110.

It will be appreciated from the above description that words stored successively in the respective storage units 104 can be passed back to the computing device only in an order which is the reverse of that in which they were previously stored on receipt from the computing device.

In many instances the storage apparatus described above will be required to store lines of digits produced successively by the computing device and representing the results of successive auxiliary calculations performed as a preliminary to the main calculations. In this case the apparatus functions first to write-in a succession of preliminary results and then later to supply these preliminary results for the completion, in sequence, of the main calculations. However, the storage apparatus described will also enable the results of successive unrelated calculation sub-sequences to be stored in order for reproduction later in the reverse order as and when required in subsequent calculations.

Whereas in the above described embodiments the storage devices 103 have comprised rectangular-loop ferrite core storage devices any other form of suitable bistable storage device may be used, as for example electro-static storage devices.

Whereas in the above described storage apparatus the read-out signals of the programming device 116 have been used to clear the input-output register 101 of the storage apparatus of a word present therein before the relevant control circuit 112 is energised by the pulse generator 106 to transfer a stored word back to the input-output register, in a modified arrangement this register is not cleared in response to read-out signals, and the biasing circuits 113 are connected to the output circuits 108 of the associated bistable devices 107 in the input-output register by gating amplifiers, shown dotted at 117 in the drawing, temporarily and as required instead of directly and permanently. These gating amplifiers 117 are controlled by write-in signals of the programming device 116, and are operative on the occurrence of a write-in signal to energise the biasing circuits 113 whose associated bistable devices 107 in the input-output register 101 are in the unit state, the other biasing circuits 113 remaining unenergised.

The gating amplifiers respond to the write-in signals over a period of sufficient duration as to enable the storage devices 103 to be properly influenced by the write-in current pulse applied to the selected control circuit 112.

The read-out amplifiers 115 in this modified arrangement are arranged to enable the input register to take up a word read out from one of the storage units 104 without first having to restore the register to the cleared or zero condition. Because of this the speed of operation of the storage apparatus is greatly increased over that obtainable when the input-output register requires to be cleared before reading out from the storage units.

In the above description of operation the switching device 105 operated to select the next control circuit 112, on writing in, before the production of the write-in current pulse, and on reading out, after the production of the read-out current pulse. This resulted in the immediate reading out of a word on receipt of a read-out instruction, but in a slightly delayed writing in action on receipt of a write-in instruction.

The switching device 105 may be readily altered to give the reverse of this mode of operation, that is so as to give delayed reading out and immediate writing in.

However, it is desirable if possible to avoid any delay in writing and reading so as to give the highest possible speed of operation. This is achieved in the aforesaid second storage apparatus which will now be described with reference to FIGURE 2 of the drawings.

The second storage apparatus is in many ways similar to that already described above with reference to FIGURE 1, and thus parts of this second storage apparatus which have counterparts in the first storage apparatus bear the same references in both figures and no further description will be given of such common parts.

The principal differences between the first and second storage apparatuses lie in the arrangements of the switching device and the current pulse generator which in FIGURE 1 were indicated by references 105 and 106 respectively. The switching device of this second storage apparatus includes a number of symmetrical transistors 118*a* to *h* connected centrally in each of the control circuits 112, and two electronic stepping or control devices 119, 120 for controlling alternate transistors. The device 119 controls the transistors 118*b*, *d*, *f* and *h*, and is arranged to apply a negative potential to the base of each of these transistors in turn whereby to render them in turn conductive, this negative base potential being transferred from one transistor to the next each time a signal is applied to either of two input circuits 121 and 122. The application of a read-out signal to the input circuit 121 causes the negative base potential to be transferred from transistor to transistor in the direction indicated by the arrow 123, that is from transistor 118*h* to *f* to *d* to *b*; whilst the application of a write-in signal to the other input circuit 122 causes the negative base potential to be transferred from transistor to transistor in the reverse direction indicated by the arrow 124.

The other control device 120 is arranged to control the transistors 118*a*, *c*, *e* and *f* in a similar manner, the application of a read-out signal to one input circuit 125 being effective to cause the negative base potential to be transferred from transistor to transistor in the direction of the arrow 123 that is from transistor 118*g* to *e* to *c* to *a*, and the application of a write-in signal to another input circuit 126 being effective to cause the negative base potential to be transferred from transistor to transistor in the reverse direction indicated by the arrow 124.

The current pulse generator comprises two portions, a read-out pulse generator 106–R and a write-in pulse generator 106–W, each having two signal input circuits 127 to 130 and two pulse output circuits 131 to 134, and two control devices 135, 136 for controlling the operation of the pulse generators 106–R and 106–W.

The control device 135 is responsive to the signals provided by the programming device 116 and operates to pass successive read-out signals to alternate input circuits 127, 128 of the read-out pulse generator 106–R, the latter responding to such signals by applying a read-out current pulse to the output circuit 131 in response to the receipt of a read-out signal on the input circuit 127, and to the output circuit 132 in response to a read-out signal applied to the input circuit 128.

The control device 136 is likewise responsive to the signals provided by the programming device 116 and operates to pass successive write-in signals to alternate input circuits 129, 130 of the write-in pulse generator 106–W. The latter responds to such signals by applying a write-in current pulse to the output circuit 133 in response to a write-in signal applied to the input circuit 129, and to the output circuit 134 in response to a write-in signal applied to the input circuit 130.

Each of the control devices 135, 136 functions on receipt of each signal from the programming device to select the next output circuit 127 to 130 for use when the next signal to be produced is received, the control device 135 passing a read-out signal to its selected circuit 127 or 128 when the next instruction is a read-out signal and the device 136 passing a write-in signal to its selected circuit 129 or 130 when the next instruction is a write-in signal. The control devices have arrows showing the particular generator input circuits selected on resetting the storage apparatus in readiness for commencing operation.

Before putting the storage apparatus into operation the storage devices are all reset to the zero condition in readiness for writing in words produced by the computer, by causing the programming device 116 to produce a resetting succession of read-out pulses whereby to read out rapidly from each storage unit in turn.

The operation of the parts just described above is as follows. Consider for example that a word had just been written into the storage unit 104 controlled by the transistor 118*e*. The act of writing in this last word caused the control device 119 to transfer its negative biasing potential from the base of transistor 118*d* to that of transistor 118*f* so that both of these transistors 118*e* and *f* are for the time being conductive.

The production of another write-in signal by the programming device 116 causes the generator control device 136 to pass the write-in signal to the input circuit 129 of the write-in pulse generator 106–W, and the latter thereupon transmits a write-in pulse through its output circuit 133 to the next lower storage unit 104 controlled by the transistor 118*f* thus writing into this storage unit the word then present in the input register 101.

Simultaneously the write-in signal appearing on the generator input circuit 129 is transmitted by the circuit 126 to the control device 120 which responds thereto by transferring its negative base potential from the transistor 118*e* to transistor 118*g* thus rendering the latter transistor conductive.

The production of a further write-in signal by the programming device 116 causes the control device 136 to pass the write-in signal to the input circuit 130 of the write-in pulse generator 106–W and to the input circuit 122 of the control device 119. The latter thereupon transfers its negative biasing potential from transistor 118*f* to transistor 118*h* whereby to render the latter conductive, and at the same time the pulse generator 106–W transmits a write-in pulse through its output circuit 134 to the storage unit controlled by the transistor 118*g*, thus writing into the associated storage unit the word then present in the register 101.

If now the programming device 116 produces a read-out signal, the control device 135 passes the read-out signal to the input circuit 128 of the read-out pulse generator 106–R and to the input circuit 121 of the control device 119. The latter responds to this signal by transferring its negative biasing potential from transistor 118*h* to transistor 118*f*, whilst the read-out pulse generator 106–R transmits a read-out current pulse through its output circuit 132 to the storage unit controlled by the transistor 118*g*, thus causing the word last stored to be returned to the input register 101 for use by the computer.

If the next instruction from the programming device 116 is another read-out signal, the control device 135 transmits this signal to the input circuit 127 of the read-out pulse generator 106–R and to the input circuit 125 of the control device 120. The latter thereupon renders the transistor 118*e* conductive instead of transistor 118*g*, and the pulse generator 106–R passes a read-out pulse to the storage unit 104 controlled by the transistor 118*f*, thus causing the word stored in that unit to be transferred into the input register 101 for use in the computer.

On the other hand if the aforesaid next instruction had been a write-in signal, the control device 136 would have energised the circuits 130 and 122, thus writing into the storage unit 104 controlled by the transistor 118*g* the word then present in the input register 101, and rendering transistor 118*h* conductive instead of transistor 118*f*.

It will be appreciated from the above that by dividing the control circuits 112 and storage units 104 into two inter-leaved groups and controlling them by the two reversible stepping control devices 119, 120, both the writing in and reading out actions are obtained without delay, and that the circuit necessary for carrying out the next instruction to be received is prepared regardless of whether this next instruction will be of the same or opposite kind to that just carried out.

In the second storage apparatus the bistable devices 107 of the input-output register 101 set automatically in accordance with a word read out from a storage unit 104 without first clearing the register in readiness, and the write-in circuits 113 are energised only when actually writing in, by means of the gating amplifiers 117 controlled by the write-in signals.

Furthermore the input-output register 101 of the storage apparatus at the same time serves as an output register for the arithmetical computing device 102, the results of calculations made thereby being transferred directly into the register 101 as and when required. These results are, however, only transferred into the storage units 104 when the programming device 116 gives a write-in instruction.

Though in the above described examples the words to be accommodated in the storage apparatus have digits which can be represented by only two separately-distinguishable electric signals or states, words in which the digits can be represented by more than two such possible signals or states may be accommodated in such a storage apparatus by arranging the input-output register 101 to include multi-stable-state devices capable of accepting such digits, and by including in each storage unit 104 bistable devices such as 103 for storing all the possible states for each digit. Furthermore, such words may have in the various digit positions digits having different numbers of separately-distinguishable values.

For convenience in each of the two examples described above each of the control circuits 112 is used for the purposes of both writing in and reading out, but if desired separate control circuits may be provided for each of these two functions.

What we claim as our invention and desire to secure by Letters Patent is:

1. An electric data storage apparatus particularly suitable for enabling the performance of high speed computations comprising an input-output word storage register for storing, at any one time, a single multi-digit word supplied to it through input circuit means, write-in means for transferring words stored successively in the register to successive ones of a plurality of non-addressable similar storage units in response solely to successive write-in signals, and read-out means for transferring words successively from successive storage units back into the register in response to successive read-out signals, the write-in means including write-in selecting means for receiving successive identical write-in signals and for automatically selecting in response thereto successive storage units respectively in a predetermined write-in sequence, and a write-in word transfer means responsive to each of the identical write-in signals for automatically effecting in response thereto a transfer of the word then stored in the register to the selected storage unit for storage therein, and the read-out means includes read-out selecting means for receiving successive identical read-out signals and for automatically selecting in response thereto successive storage units respectively in a predetermined read-out sequence which is the reverse of the said write-in sequence, and a read-out word transfer means responsive to each of the identical read-out signals for automatically effecting in response thereto transfer of the word then stored in the selected storage unit to the register, whereby words are automatically returned to the register in an order which is the reverse of that in which they were originally presented to the register through the said input circuit means for storage in the respective storage units.

2. An electric data storage apparatus according to claim 1, wherein the input-output word storage register comprises a plurality of similar bi-stable storage devices, one for each digit position in a word, capable of supplying an electric potential at an output circuit thereof according to the state of the device, wherein each of the said storage units comprises a plurality of bi-stable magnetic core storage elements, one for each of the said digit positions, wherein the said write-in word transfer means includes a plurality of first electric circuits arranged for energisation in accordance with the respective potentials of the said bi-stable devices of the said register and linking respectively with groups of the said bi-stable storage elements occupying corresponding digit positions in the said storage units, a plurality of second electric circuits linking respectively with the bi-stable storage elements of the respective storage units, and a write-in pulse generator for supplying in response to successive write-in signals write-in current pulses alternately to respective groups of even and odd numbered ones of the said second electric circuits, wherein the said read-out word transfer means includes a plurality of third electric circuits linking respectively with groups of the said bi-stable storage elements occupying corresponding digit positions in the said storage units and being capable of setting the corresponding bi-stable storage devices of the said input-output word register in accordance with a word being read-out of a storage unit, and a read-out pulse generator for supplying in response to successive read-out signals read-out current pulses alternately to respective groups of odd and even numbered ones of the said second electric circuits, and wherein the said write-in and read-out selecting means together include a plurality of gating devices connected respectively in the said ones of the said second electric circuits, and gating device control means responsive to the write-in and read-out signals and effective always to maintain two only of the gating devices open at any time whereby on receipt of either a write-in or a read-out signal as the case may be a word may be stored in the next available storage unit in the sequence or a word last stored in a storage unit may be read out without any delay, this gating device control means being operative in response to a write-in signal to close a gating device immediately preceding in the sequence that then in use to store a word in a storage unit and to open instead another gating device immediately ahead of the gating device then in use, and in response to a read-out signal to close a gating device immediately ahead of the gating device then in use to read-out a word from a storage unit and to open instead a gating device immediately preceding that gating device then in use.

3. An electric data storage apparatus according to claim 2, including a first auxiliary selecting means for receiving write-in signals and supplying corresponding write-in signals to the write-in pulse generator alternately at a first one and a second one of two generator input circuits whereby to cause that generator to energise alternately the groups of odd and even-numbered second electric circuits respectively, a second auxiliary selecting means for receiving read-out signals and supplying corresponding read-out signals to the read-out pulse generator alternately at a first one and a second one of two generator input circuits whereby to cause that generator to energise alternately the groups of odd and even numbered second electric circuits respectively, and wherein the gating device control means includes a first gating control device for sequentially opening the gating devices in the odd-numbered second electric circuits in a first sense in response to write-in signals supplied by the first auxiliary selecting means to the second input circuit of the write-in pulse generator and in an opposite sense in response to read-out signals supplied by the second auxiliary selecting means to the second input circuit of the read-out pulse generator, and a second gating control device for sequentially opening the gating devices in the even-numbered second electric circuits in the said first sense in response to write-in signals supplied by the first auxiliary selecting means to the first input circuit of the write-in pulse generator and in the said opposite sense in response to read-out signals supplied by the second auxiliary selecting means to the first input circuit of the readout pulse generator.

4. An electric data storage apparatus according to claim 3, wherein the write-in and read-out pulse generators are effectively connected electrically in series at the respective ends of the said groups of even and odd-numbered second electric circuits, and wherein the said gating devices comprise symmetrical transistors connected symmetrically between the two pulse generators and having their respective base electrodes controlled by the said first and second gating control devices.

References Cited by the Examiner

UNITED STATES PATENTS

| | | | |
|---|---|---|---|
| 2,957,163 | 10/1960 | Kodis | 340—172.5 |
| 3,021,511 | 2/1962 | Vinal | 340—172.5 |
| 3,046,528 | 7/1962 | Rowe | 340—172.5 |
| 3,047,228 | 7/1962 | Bauer et al. | 340—172.5 |
| 3,061,818 | 10/1962 | Newby | 340—172.5 |

ROBERT C. BAILEY, *Primary Examiner.*

MALCOLM A. MORRISON, *Examiner.*

W. M. BECKER, P. J. HENON, *Assistant Examiners.*